United States Patent Office
3,542,799
Patented Nov. 24, 1970

3,542,799
4,4a,6,7,12,12b,13,13a-OCTAHYDRO-1H-PYRIDO
[1,2-a:3,4-b']DIINDOL-3(2H)-ONES
John Shavel, Jr., Mendham, and Glenn C. Morrison, Dover, N.J., assignors to Warner-Lambert Pharmaceutical Company, Morris Plains, N.J., a corporation of Delaware
No Drawing. Filed Aug. 14, 1968, Ser. No. 752,464
Int. Cl. C07d 31/42
U.S. Cl. 260—296          2 Claims

ABSTRACT OF THE DISCLOSURE

The present invention discloses 4,4a,6,7,12,12b,13,13a-octahydro-1H-pyrido[1,2-a:3,4-b']diindol - 3(2H) - ones and intermediates useful in their production. These compounds are produced by alkylating an indole nitrogen atom of a compound of the formula:

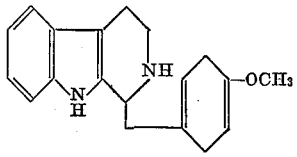

to give a compound of the formula:

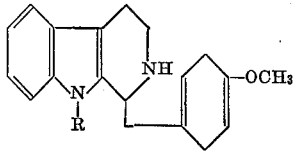

Compound II is then in turn cyclized to give the desired 4,4a,6,7,12,12b,13,13a-octahydro - 1H - pyrido[1,2-a:3,4-b']diindol-3(2H)-ones. These compounds are useful as hypotensive agents.

The present invention relates to a new class of heterocyclic compounds and relates more particularly to new and novel 4,4a,6,7,12,12b,13,13a-octahydro - 1H - pyrido [1,2-a:3,4-b']diindol-3(2H)-ones which may be represented by the following structural formula:

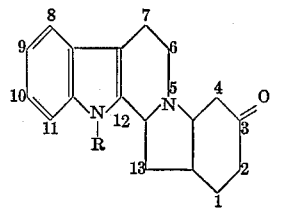

wherein R represents lower alkyl of 1 to 7 carbon atoms, such as methyl, ethyl, propyl, isopropyl, butyl, isobutyl and the like.

The symbol R as used hereinafter has the same meaning as described above.

Also embraced within the scope of this invention are the pharmaceutically acceptable acid addition salts of the subject compounds, as well as their quaternary ammonium salts and N-oxides.

This invention also includes within its scope a new and novel process for preparing the subject compounds, as well as the intermediates useful for their production.

The compounds of this invention, including the salts and N-oxides, exhibit hypotensive activity in mammals, such as dogs, cats, rats and the like. In order to use these compounds, they are combined with a parenterally acceptable vehicle, such as water, saline and oil to form dosage forms suitable for parenteral administration. In treating hypertensive mammals the dosage range of 1 to 10 mg. intravenously, per kg. of body weight is recommended. This dosage regimen may be varied according to age, sex, weight and severity of the condition being treated by methods well known to the healing arts.

According to the present invention, the subject compounds are prepared by treating a β-carboline of the formula:

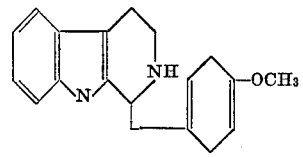

with sodium hydride and an alkyl carbonate such as dimethyl carbonate to give an N–R substituted β-carboline of the formula:

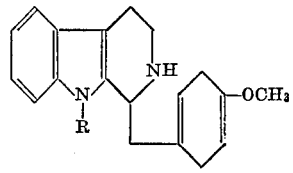

Treatment of Compound II with a mineral acid such as hydrochloric acid under reflux conditions in an alcohol such as methanol, yields the desired 4,4a,6,7,12,12b,13,13a-octahydro-1H-pyrido[1,2-a:3,4 - b']diindol - 3(2H)-ones of this invention.

The compounds of our invention may be converted into their pharmaceutically acceptable non-toxic acid addition and quaternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric, and nitric acids. The acid addition salts may be prepared in the conventional manner by treating a solution or suspension of the free base in an organic solvent with the desired acid and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate, or methyl p-toluene sulfonate.

The N-oxides are prepared by treating the subject compounds with an oxidizing agent, for example, hydrogen peroxide.

The following examples are included in order further to illustrate the invention.

EXAMPLE 1

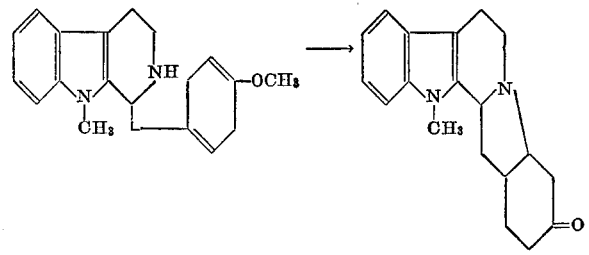

1,4,4a,6,7,12b,13,13a-octahydro-12-methyl-12H-diindolo[1,2-a: 2',3'-c]pyridin-3(2H)-one A solution of 750 mg. of 2,3,4,9-tetrahydro-1-[(4-methoxy - 1,4 - cyclohexadienyl)methyl] - 9 - methyl - 1H-pyrido[3,4-b]indole and 15 ml. of hydrochloric acid in 40 ml. of methanol was refluxed for 1 hour. The methanol was removed on the steam bath. The solution was made basic with 10% sodium hydroxide solution and extracted with chloroform. The chloroform layer was washed with water, dried over sodium sulfate, and the solvent was removed. The residue was chromatographed on 20 g. of alumina. Elution with benzene afforded, after recrystallization from Skellysolve B, 69 mg. (10%) of isomer A, M.P. 197–199.5° C. Recrystallization from acetone-isopropyl ether gave an analytical sample, M.P. 198.5–199.5° C.

Analysis.—Calcd. for $C_{19}H_{22}N_2O$ (percent): C, 77.52; H, 7.53; N, 9.52. Found (percent): C, 77.74; H, 7.70; N, 9.66.

Elution with methylene chloride afforded, after recrystallization from ether-isopropyl ether, 75 mg. (11%) of isomer B, M.P. 145–146° C. Recrystallization from acetone-isopropyl ether gave an analytical sample, M.P. 143–143.5° C. and 146–148.5° C.

Analysis.—Calcd. for $C_{19}H_{22}N_2O$ (percent): C, 77.52; H, 7.53; N, 9.52. Found (percent): C, 77.49; H, 7.57; N, 9.36.

EXAMPLE 2

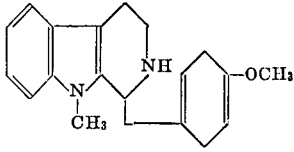

2,3,4,9-tetrahydro-1-[(4-methoxy-1,4-cyclohexadienyl)methyl]-9-methyl-1H-pyrido[3,4-b]indole A mixture of 3.0 g. of 2,3,4,9-tetrahydro-1-[(4-methoxy - 1,4 - cyclohexadien - 1 - yl)methyl] - 1H - pyrido [3,4-b]indole, 6 g. of sodium hydride, 36 ml. of dimethyl carbonate, and 200 ml. of tetrahydrofuran was refluxed for 20 hours. The reaction mixture was poured into 600 ml. of water and extracted with chloroform. The chloroform layer was washed with water, dried over sodium sulfate, and the solvent was removed. The residue, after trituration with Skellysolve B, afforded 0.87 g. (30%) of a crystalline solid, M.P. 128–132° C. Recrystallization from Skellysolve B gave an analytical sample, M.P. 131.5–133.5° C.

Analysis.—Calcd. for $C_{20}H_{24}N_2O$ (percent): C, 77.88; H, 7.84; N, 9.08. Found (percent): C, 77.99; H, 7.75; N, 8.96.

It is understood that the foregoing detailed description is given merely by way of illustration and that many variations may be made therein without departing from the spirit of our invention.

Having described our invention, what we desire to secure by Letters Patent is:

1. A free base of the formula:

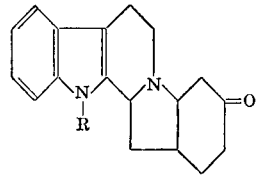

wherein R is lower alkyl and its pharmaceutically acceptable acid addition salts, and its N-oxides.

2. The compound of claim 1 where R is methyl.

References Cited

UNITED STATES PATENTS 2,866,788   12/1958   Pachter _____ 260—296
3,200,124   8/1965    Shavel et al. _____ 260—296

FOREIGN PATENTS 840,267   7/1960   Great Britain.

ALAN L. ROTMAN, Primary Examiner

U.S. Cl. X.R.

260—294.8, 295; 424—263